July 5, 1938.  H. S. JANDUS  2,122,646
BRAKE LEVER CONSTRUCTION
Filed Oct. 23, 1936   2 Sheets-Sheet 2
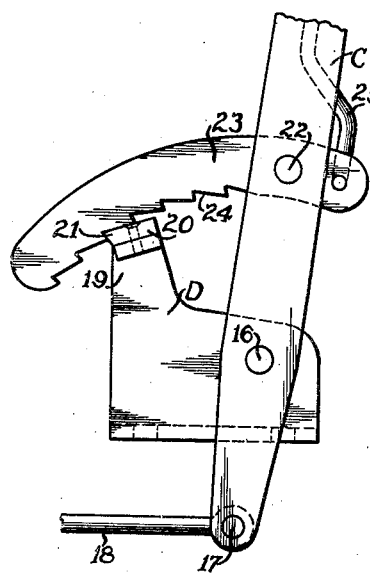
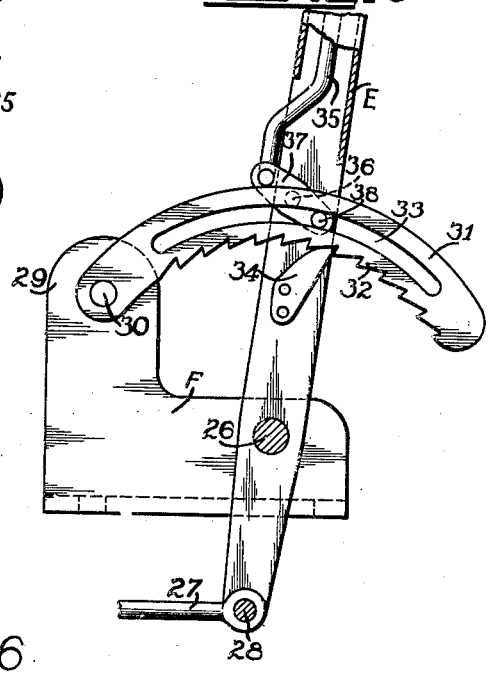
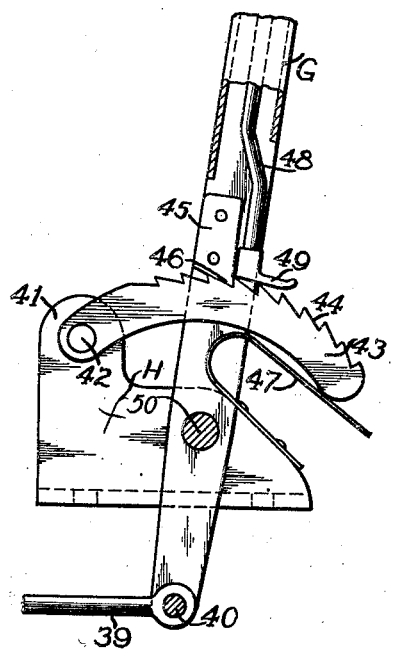
Inventor
HERBERT S. JANDUS Patented July 5, 1938

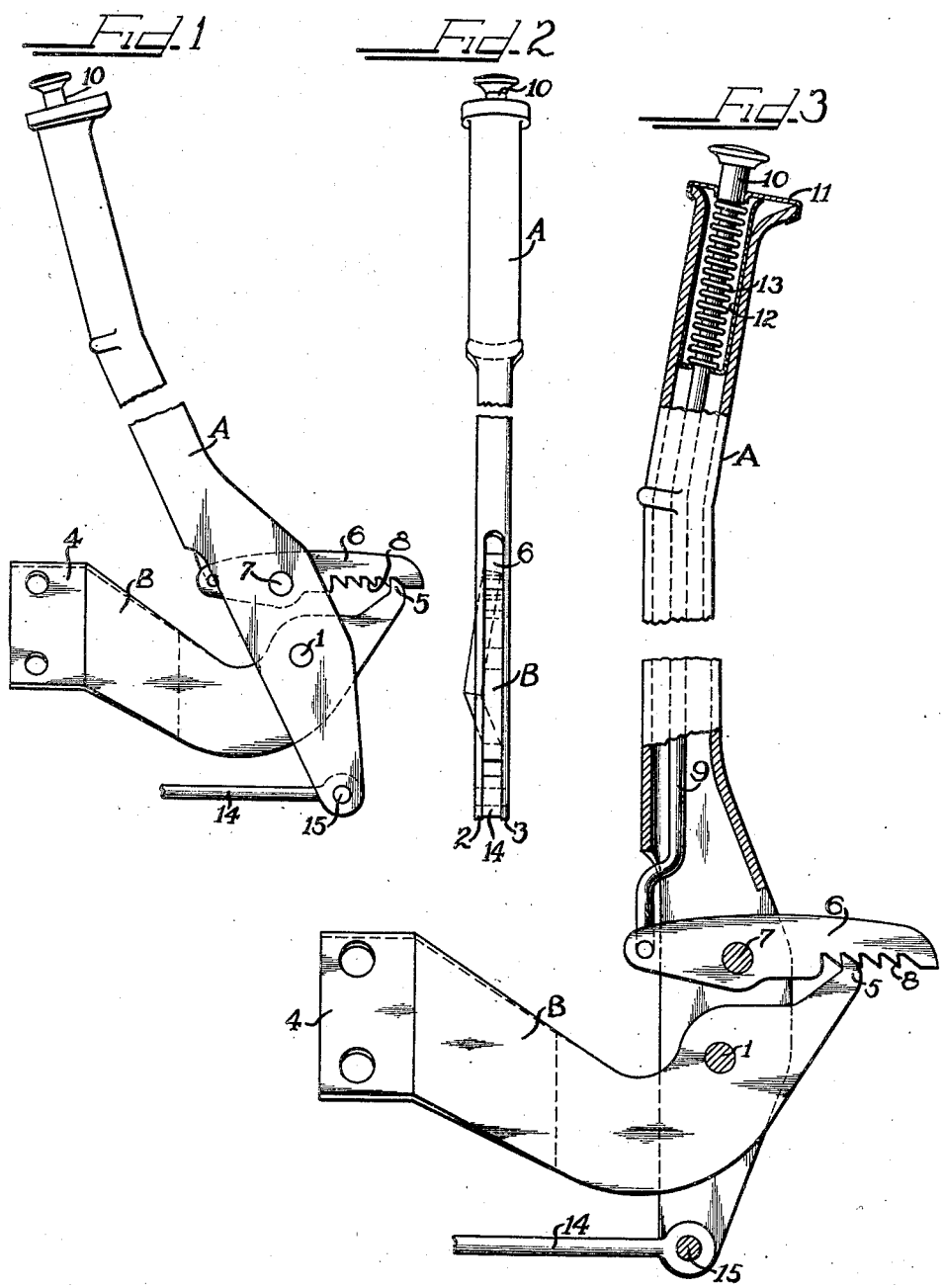

2,122,646

UNITED STATES PATENT OFFICE 2,122,646

BRAKE LEVER CONSTRUCTION

Herbert S. Jandus, Detroit, Mich., assignor to Oakes Products Corporation, North Chicago, Ill., a corporation of Michigan Application October 23, 1936, Serial No. 107,237

2 Claims. (Cl. 74—541)

The present invention relates to brake lever construction, and more particularly to brake lever construction for automotive vehicles.

An object of the present invention is to simplify and improve brake lever construction, particularly for automotive vehicles.

Another object of the present invention is to provide a brake lever construction which will readily latch the lever in any desired position and as readily unlatch it, with minimum effort.

A further object of the present invention is to provide a brake lever construction which may be economically manufactured, easily applied and operated, and efficient and durable in use.

A still further object of the present invention is to provide a brake lever construction, including a bracket and a lever pivoted to it, the lever and bracket supporting cooperating engageable members for latching the lever in desired position, one of which members comprises a pivoted ratchet bar movable into and out of latching engagement with the other member.

The above, other and further object of the present invention will be readily apparent from the following description and accompanying drawings.

The accompanying drawings illustrate embodiments of the present invention, and the views thereof are as follows:

Figure 1 is a side elevational view of a brake lever construction, embodying principles of the present invention, showing the lever in set position.

Figure 2 is a front elevational view of the lever of Figure 1.

Figure 3 is a view, partly in elevation and partly in section, of the brake lever construction of Figures 1 and 2, showing the lever in substantially released position.

Figure 4 is a fragmental elevational view of a brake lever construction of modified form.

Figure 5 is a fragmental view, partly in elevation and partly in section, of another modified form of the present invention.

Figure 6 is a fragmental view, partly in elevation and partly in section, of a still further modified form of the present invention.

The drawings will now be explained.

The embodiment of the invention illustrated in Figures 1, 2 and 3 includes a lever A and a bracket B, the lever being pivoted to the bracket at 1. The lever is illustrated as a hollow one with spaced legs 2 and 3 which straddle the bracket B. The bracket B has an attaching portion 4 for securing the bracket in position on an automotive vehicle. On the other side of the pivot 1 from the attaching portion 4 is an end having a pointed pawl or dog 5 adapted to engage a ratchet bar 6 which is pivoted at 7 to the lever above the pivotal connection 1 of the lever to the bracket, and which ratchet bar is adapted to rock upon its pivot. The ratchet bar 6 is pivoted in unbalanced relation so that the heavier end thereof may engage the dog or pawl 5 of the bracket. The under margin of the ratchet bar 6 is provided with a plurality of teeth 8 for cooperating with the pawl or dog 5.

Extending within the brake lever A is an actuating rod 9 connected at one end to the ratchet bar 6 and with its other end provided with a thumb button 10 which projects through an end closure 11 on the upper end of the handle portion of the lever. Within the handle portion of the lever is a socket element 12 within which is a spring 13 surrounding the rod 9 and bearing against the button 10. The purpose of the spring 13 is to maintain the button 10 projected and the ratchet bar 6 rocked to insure engagement of one of its teeth with the pawl or dog 5 of the bracket.

The lower extremities of the legs 2 and 3 extend below the bracket B, where a brake rod 14 is connected by means of a pivot pin 15.

Figure 3 illustrates the position of the brake lever A when it is in a substantially released position. To move the brake lever to set the brakes, it is pulled to the left, as viewed in Figures 1 and 3, to the position of Figure 1, which movement is effected by pulling on the upper end of the lever, without manipulation of the button 10. The unbalanced mounting of the ratchet bar 6, together with the action of the spring 13, causes engagement of a tooth of the ratchet bar 6 with the pawl or dog 5, as the lever is moved in a direction to set the brakes.

To release the lever from set position, the operator grasps the upper end thereof and gives it a slight pull to the left, as viewed in Figure 1, then depresses the button 10 which in turn rocks the ratchet bar 6 about its pivot 7 to raise the teeth thereof out of the path of the dog or pawl 5, whereupon the lever is moved to the right to released position.

The lever illustrated in Figure 4 discloses a hollow lever C and a bracket D, which bracket is suitably secured to some part of the vehicle. The lever C is pivoted to the bracket D at 16 to rock about its pivot in the usual manner. Preferably, the lower end of the lever comprises spaced legs, which at their lower ends are connected by means of a pin 17 to a brake rod 18.

The bracket D has an upstanding portion 19 to which is secured a block 20 having a wedge-like margin 21 serving as a dog or pawl. Pivoted to the lever C, at 22, is a swinging ratchet bar 23 pivoted to the lever in unbalanced position, with its longer or heavier end overlying the pawl or dog 21. The lower margin of the ratchet bar 23 is provided with a plurality of notches or teeth 24 for selective latching engagement with the dog or pawl 21.

The lever C is provided with an actuating rod 25 which is connected at its lower end to the ratchet bar 23 on the side of the pivot remote from the teeth 24. This actuating rod may be operated in any usual manner, as, for instance, by means of a thumb button, as illustrated in Figures 1, 2, and 3, or by means of a spoon bill handle which is known in the art.

The active faces of the teeth 24 and the cooperating active face of the dog or pawl 21 are so shaped that, as the lever C is swung to the left, as viewed in Figure 4, to set the brakes, the teeth will ride over the dog or pawl until the desired position of the lever is reached, and thereupon one of the teeth will engage the dog or pawl, as shown in this figure, to latch the lever in desired position.

The unbalanced mounting of the ratchet bar 23 on its lever C is of such nature as to eliminate the necessity for a spring to maintain the bar in latched engagement with the dog or pawl, yet a spring may be used, if so desired.

To release the lever C from latched position, the upper end thereof is given a slight pull to the left, as viewed in Figure 4, the actuating rod 25 is depressed to swing the engaged tooth of the ratchet bar 23 out of latching engagement with the dog or pawl 21, and the lever is then swung to the right, to released position.

The form of the invention illustrated in Figure 5 includes a lever E and a bracket F. The lever is shown as hollow with a leg pivoted at 26 to a portion of the bracket F. On the lower end of the lever E is a brake rod 27 pivoted at 28. The bracket F has an upstanding portion 29 to which is pivoted at 30 one end of an arcuate ratchet bar 31. This bar is provided on its lower margin with teeth 32, and between its margins with an arcuate slot 33.

Secured to the lever E is a pawl or dog 34 being fastened by riveting, welding or in any known and convenient manner. The dog 34 is shaped so as to engage any of the teeth 32 of the ratchet bar with latching engagement. For swinging the ratchet bar 31 out of latching engagement with the dog or pawl 34, an actuating rod 35 extends through the hollow interior of the lever E, and at its upper end is provided with a thumb button or is connected to a spoon bill handle for manipulation.

Pivoted at 36 to the lever E is a rocker arm 37, one end of which is connected to the actuating rod 35 and the other end of which carries a pin 38 working in the slot 33 of the ratchet bar 31. The pivotal mounting of the ratchet bar 31 in unbalanced position tends to maintain the bar in contact with the dog or pawl 34. If desired, a spring may be applied to the actuating rod 35, or elsewhere, to insure positive latching engagement of the ratchet bar 31 with the dog or pawl, although this is not essential.

The position of the lever E in Figure 5 is shown in partially set position. To apply the brakes, the lever is swung about its pivot with the lower end of the lever moving in a counter-clockwise direction, as viewed in Figure 5, whereupon the dog or pawl 34 moves underneath the ratchet bar 31 displacing it until the desired position of the lever is reached, whereupon the dog or pawl 34 engages one of the teeth 32 of the ratchet bar 31 to latch the lever in such desired position.

To release the lever from latched position, the upper end is given a slight pull to the left, the actuating rod 35 depressed, which rocks the arm 37 to lift the ratchet bar 31 out of the path of movement of the dog or pawl 34, whereupon the lever may be returned to released position. When pressure on the actuating rod 35 is removed, the ratchet bar 31 will, by gravital action, rest against the pawl 34 so that the pawl may enter one of the teeth 32 of the ratchet bar.

The form of the invention illustrated in Figure 6 includes a hollow brake lever G pivoted at 50 to a bracket H. The lever has a part projecting below the pivot 50, to which a brake rod 39 is connected, as at 40. The bracket H has an upstanding part 41, to which is pivoted at 42 one end of a swinging ratchet bar 43. This bar has teeth 44 formed on its upper margin. The lever G is provided with a dog or pawl 45 having a pointed portion 46 shaped to engage any of the teeth 44 of the ratchet bar. The pawl or dog 45 is secured to the lever by riveting, welding or the like in fixed position.

In order to maintain the ratchet bar 43 in position to be engaged by the pointed portion 46 of the pawl or dog 45, a spring 47 is interposed between the bracket H and the free end of the ratchet bar 43 and urges this end of the bar upwardly. In order to disengage the ratchet bar 43 from latching engagement with the pawl, an actuating rod 48 is provided at its lower end with a shoe 49 which is positioned to bear against the crests of the teeth 44 of the ratchet bar 43. When this actuating rod is depressed, the free end of the ratchet bar 43 is swung downwardly, against the action of the spring 47, to disengage the ratchet bar from the pawl, whereupon the lever may be moved to released position.

To set the brakes with this form of lever, the upper end of the lever is pulled to the left, the ratchet bar permitting riding of the pawl 45 over it. The provision of the spring, tending to urge the ratchet bar 43 upwardly, insures latching contact between the ratchet bar and the pawl whenever the lever has been moved to desired position.

To release the lever, the actuating rod 48 is depressed, whereupon the shoe 49 thereof pushes the free end of the actuating bar 43 downwardly, out of the path of the pointed portion 46 of the pawl, whereupon the lever may be moved to the right, to released position.

It will be observed that the brake lever construction of the present invention contemplates, in the main, latching engagement between the ratchet bar and pawl with gravital action. It will also be observed that the bracket of the present invention has an upstanding part which actively cooperates in effecting latching engagement between the rockable ratchet bar and dog or pawl. By "upstanding part" is meant such portion of the bracket as may lie above the pivotal connection between the brake lever and bracket.

In some forms of the present invention, the upstanding part of the bracket constitutes or carries the dog or pawl member, while in other forms it carries the rockable ratchet bar.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. Brake lever construction including a bracket, a brake lever pivoted to said bracket, said bracket having an upstanding part constituting a pawl or dog, a ratchet bar pivoted between its ends to the lever in unbalanced relation with its teeth in the path of said pawl or dog and normally engaging said pawl or dog with gravital action, and means connected to one end of said ratchet bar for unlatching it from said pawl, the other end of said bar being free.

2. Brake lever construction including a bracket, a brake lever pivoted to said bracket, said bracket having an upstanding part constituting a pawl or dog, and a substantially straight ratchet bar pivoted to the lever in unbalanced relation with its teeth in the path of said pawl or dog and normally engaging said pawl or dog with gravital action.

HERBERT S. JANDUS.